(12) United States Patent
Cho et al.

(10) Patent No.: US 12,407,890 B2
(45) Date of Patent: Sep. 2, 2025

(54) METHOD OF SYNCHRONIZING PLAYBACK OF VIDEO AND AUDIO OF DIGITAL CONTENT AND DEVICE USING THE SAME

(71) Applicant: AD CONNECTED, INC., Seoul (KR)

(72) Inventors: Inje Cho, Seoul (KR); Daehee Lee, Seoul (KR)

(73) Assignee: AD CONNECTED, INC., Seoul (KR)

( * ) Notice: Subject to any disclaimer, the term of this patent is extended or adjusted under 35 U.S.C. 154(b) by 19 days.

(21) Appl. No.: 18/547,937

(22) PCT Filed: Feb. 26, 2021

(86) PCT No.: PCT/KR2021/002504
§ 371 (c)(1),
(2) Date: Aug. 25, 2023

(87) PCT Pub. No.: WO2022/181860
PCT Pub. Date: Sep. 1, 2022

(65) Prior Publication Data
US 2024/0137598 A1   Apr. 25, 2024
US 2024/0236399 A9   Jul. 11, 2024

(51) Int. Cl.
*H04N 21/43* (2011.01)
*G01S 5/02* (2010.01)
*H04R 1/20* (2006.01)

(52) U.S. Cl.
CPC ....... *H04N 21/4307* (2013.01); *G01S 5/0284* (2013.01); *H04R 1/20* (2013.01)

(58) Field of Classification Search
CPC .. H04N 21/4307; H04N 21/43; H04N 21/436; H04N 21/439; H04N 21/8547; G01S 5/0284; H04R 1/20; H04R 3/12; H04R 2203/12; H04S 7/301; H04S 2400/13
See application file for complete search history.

(56) References Cited

U.S. PATENT DOCUMENTS

2004/0151325 A1*  8/2004  Hooley .................... H04R 3/12
                                                  381/19
2006/0290810 A1*  12/2006  Mallinson .............. H04N 5/04
                                                  348/E5.009

(Continued)

*Primary Examiner* — Michael E Teitelbaum
(74) *Attorney, Agent, or Firm* — Studebaker Brackett PLLC

(57) ABSTRACT

The present disclosure relates to a method of synchronizing playback of video and audio of a digital content. The method includes at least: transmitting, by a plurality of devices connected to a network, a video playback delay time, an audio playback delay time, and position information, to a master device; receiving a video playback delay time list or a video playback sync timestamp during a video playback duty cycle; receiving at least one of a virtual synchronization audio delay distance, audio delay distances of the connected devices, a sweet spot position, an audio playback delay time list, and an audio playback sync timestamp during an audio playback duty cycle; determining a video playback delay time correction amount, and correcting the video playback sync timestamp in consideration of the video playback delay time correction amount; and correcting the audio playback sync timestamp with the audio playback delay time correction amount.

9 Claims, 12 Drawing Sheets

(56) References Cited

U.S. PATENT DOCUMENTS

2009/0290064 A1\* 11/2009 Matsumoto .......... H04N 21/439
 725/116
2015/0067016 A1\* 3/2015 Park ........................ H04W 4/08
 709/201

\* cited by examiner

[FIG. 1]
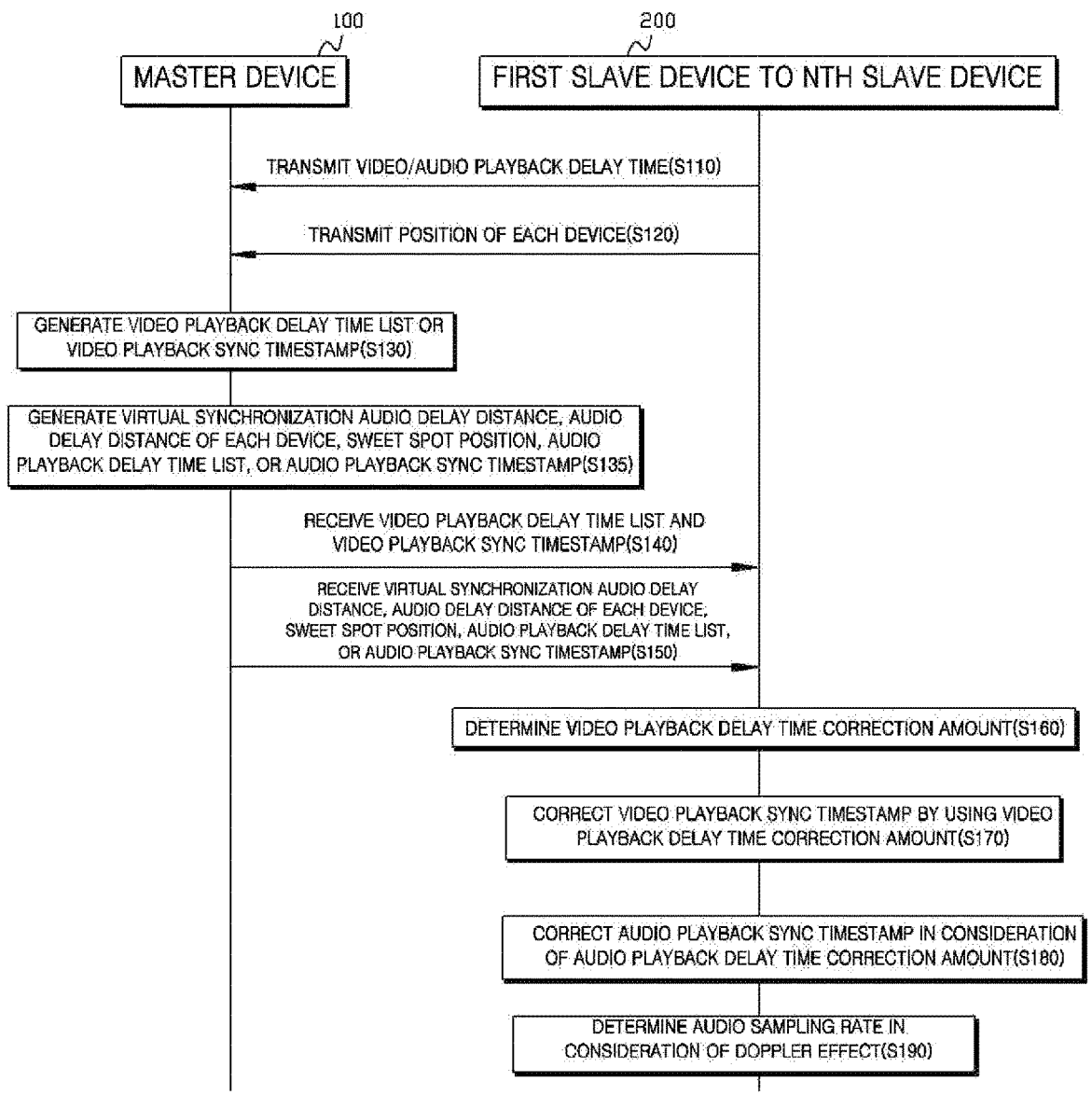

[FIG. 2]
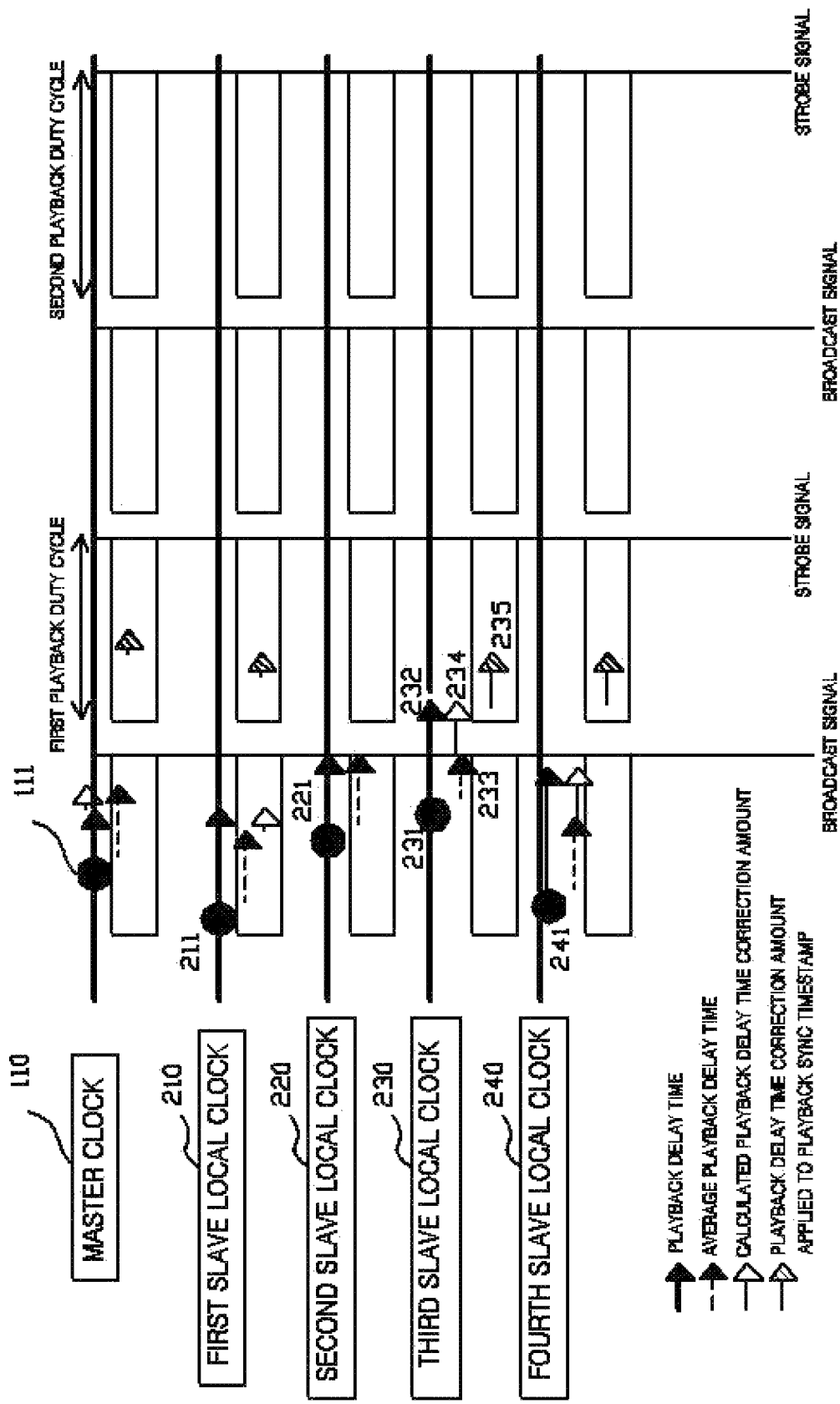

[FIG. 3]
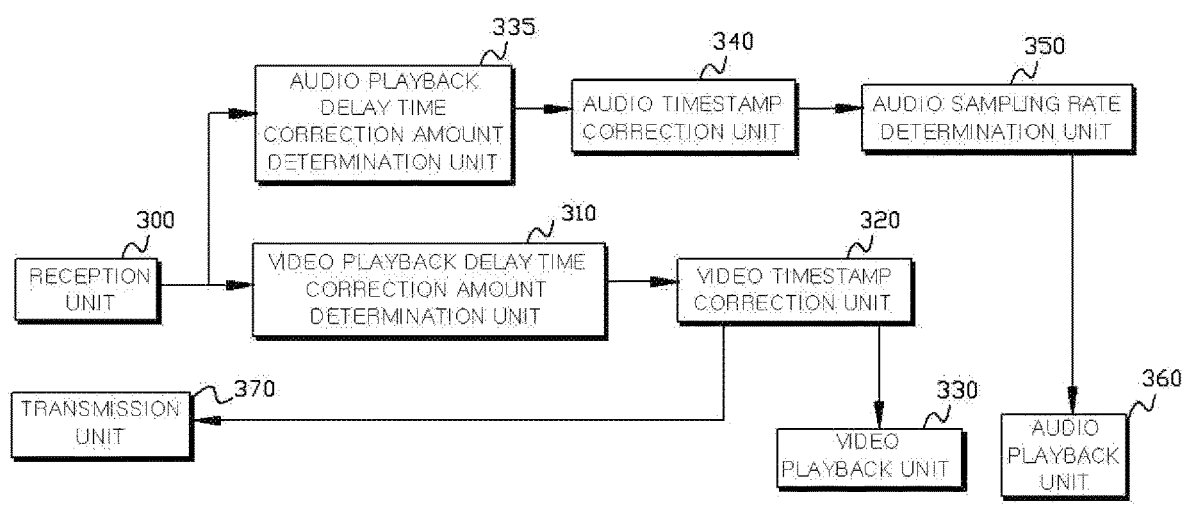

[FIG. 4]
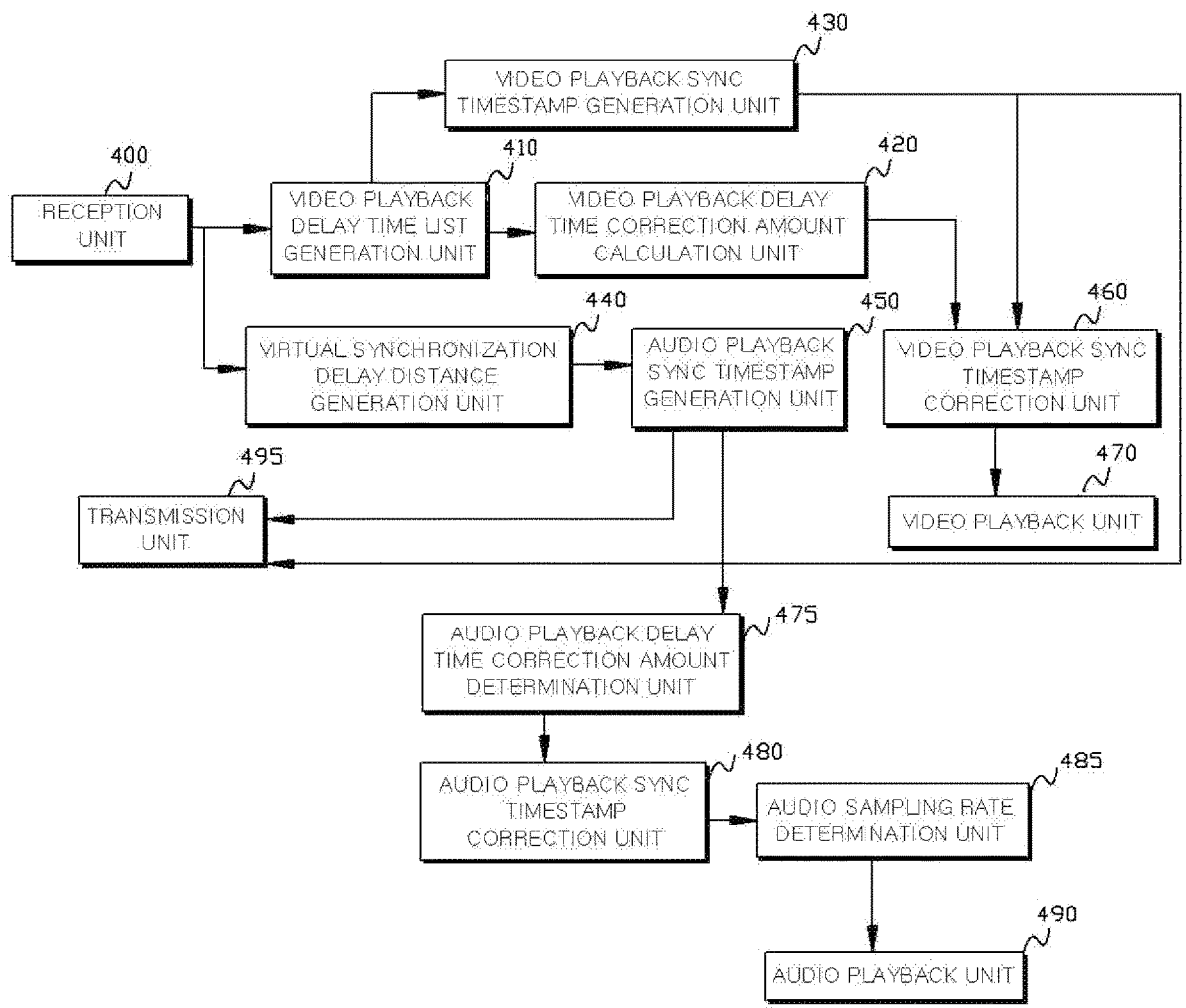

[FIG. 5]
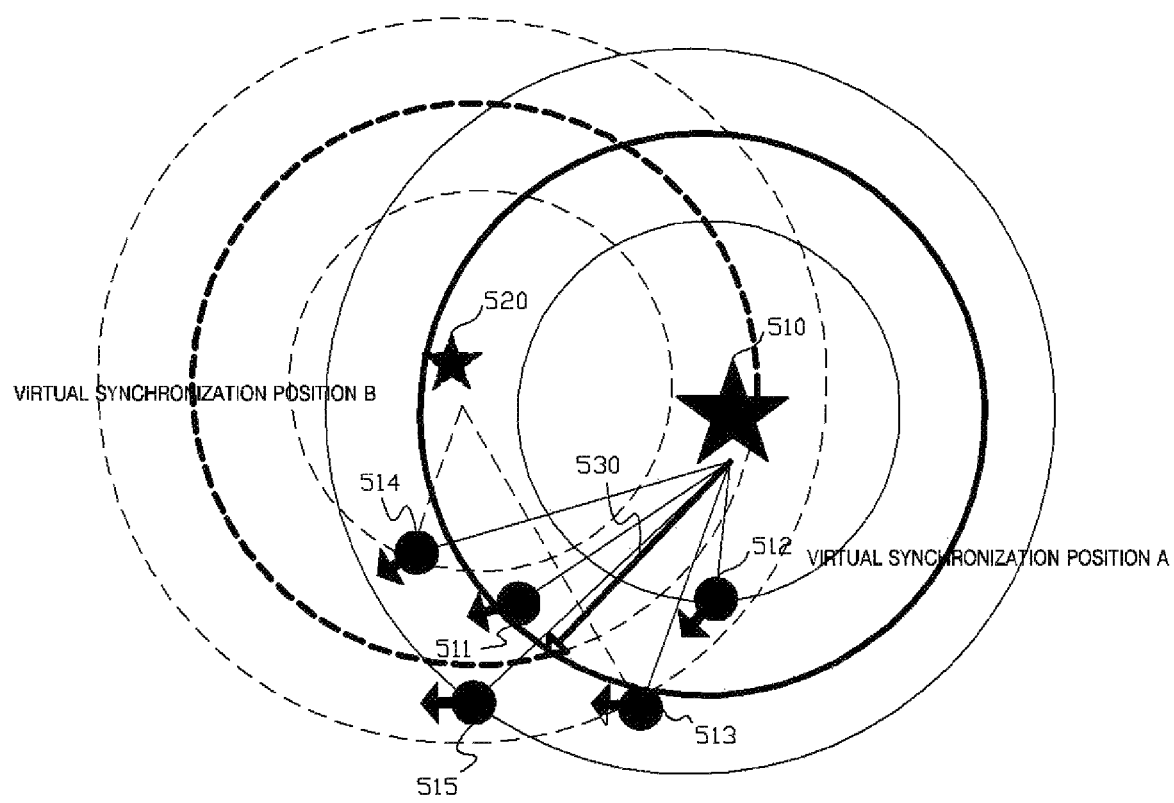

[FIG. 6]
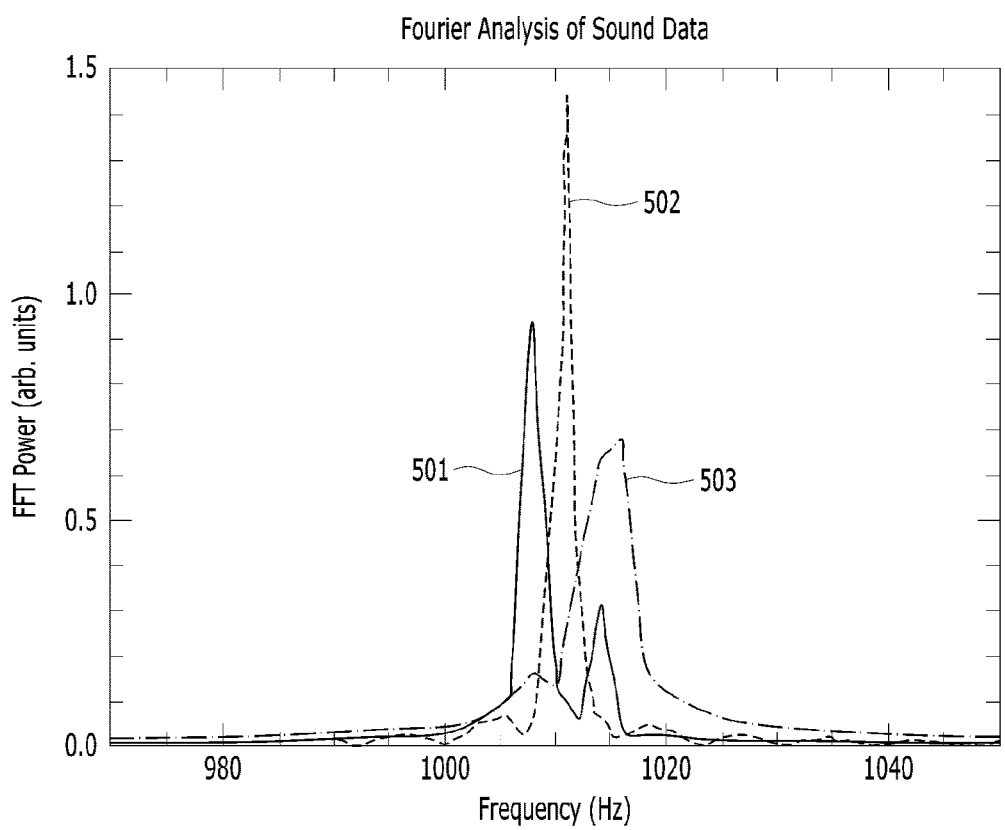

[FIG. 7]
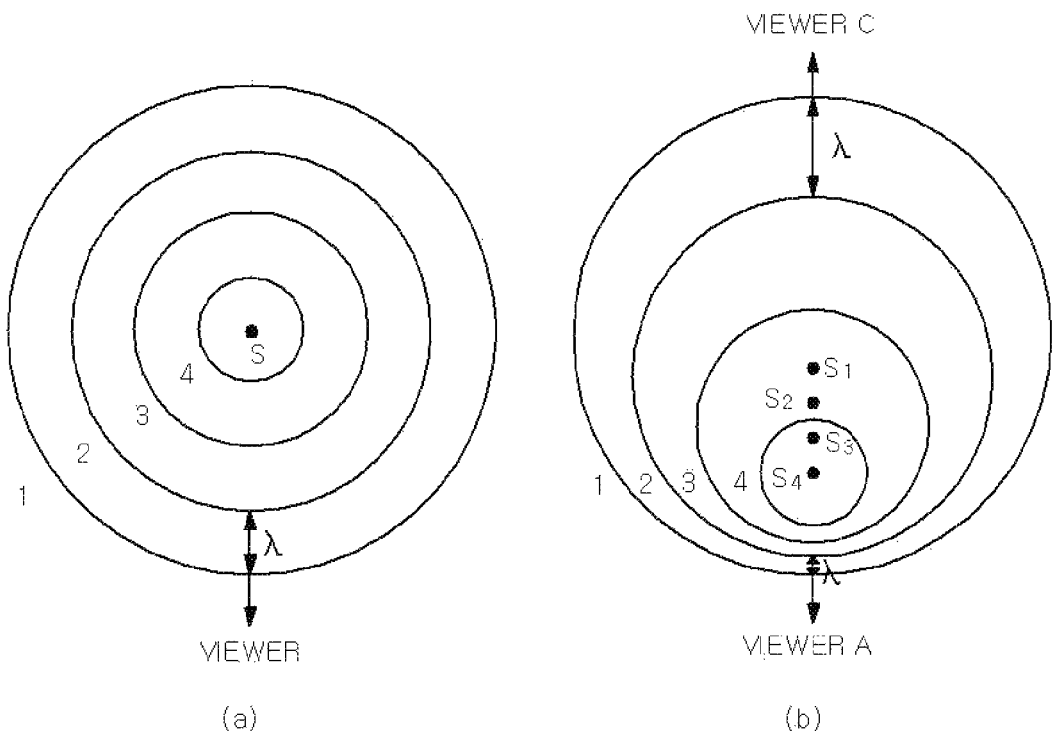
(a)  (b)

[FIG. 8]
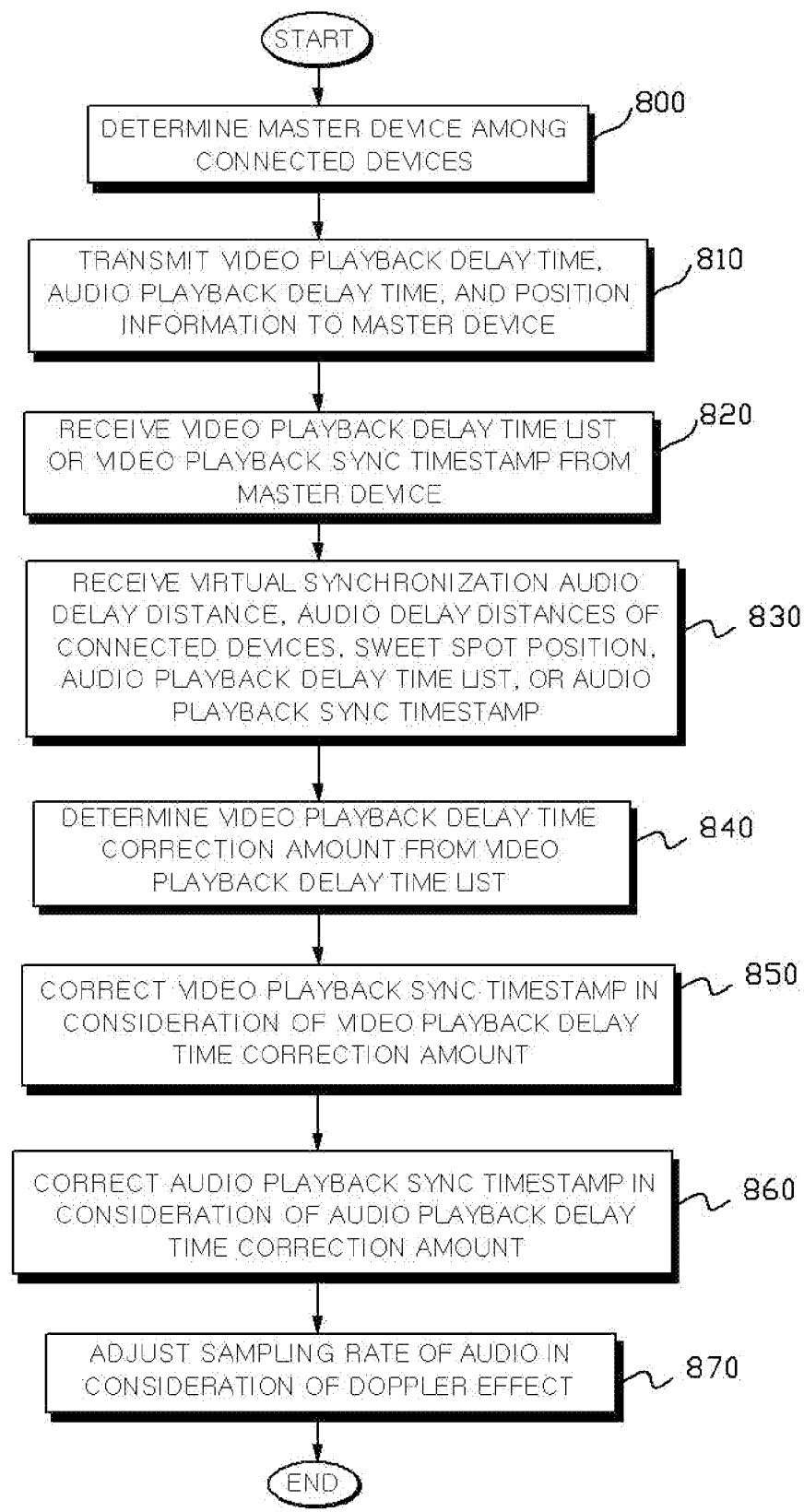

[FIG. 9]
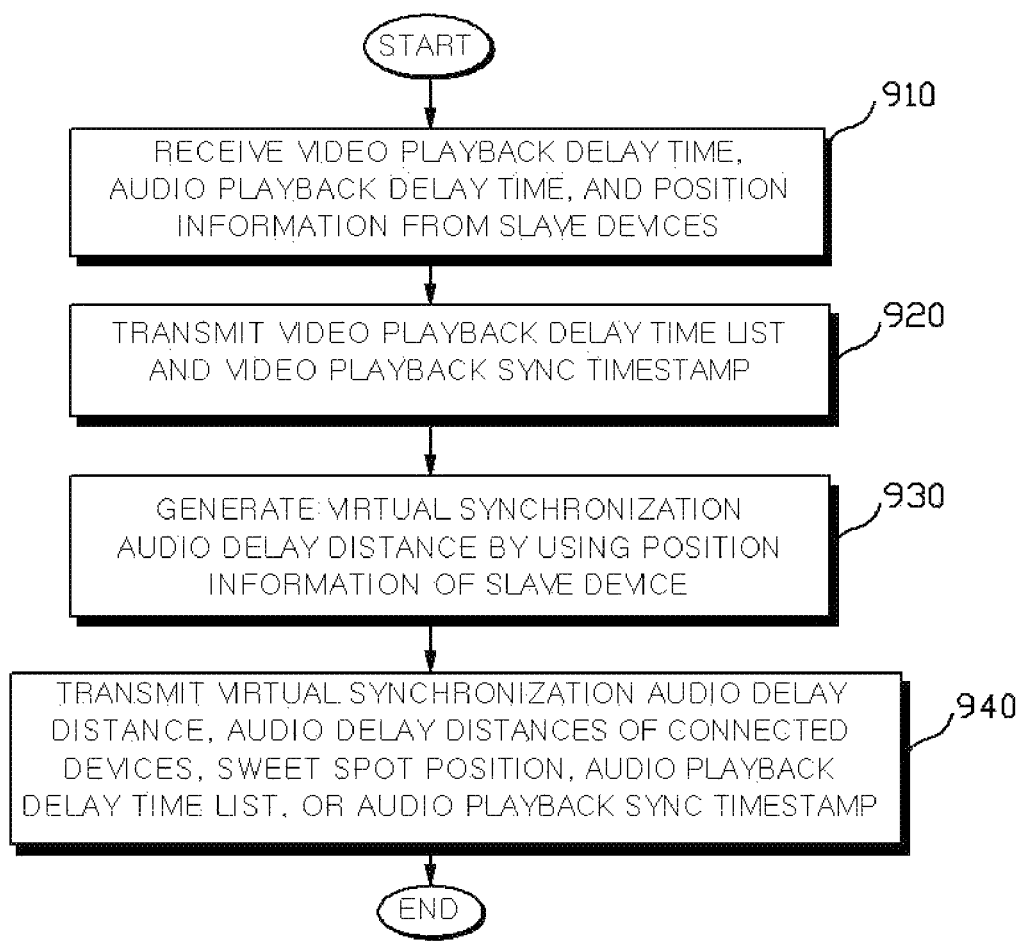

[FIG. 10]
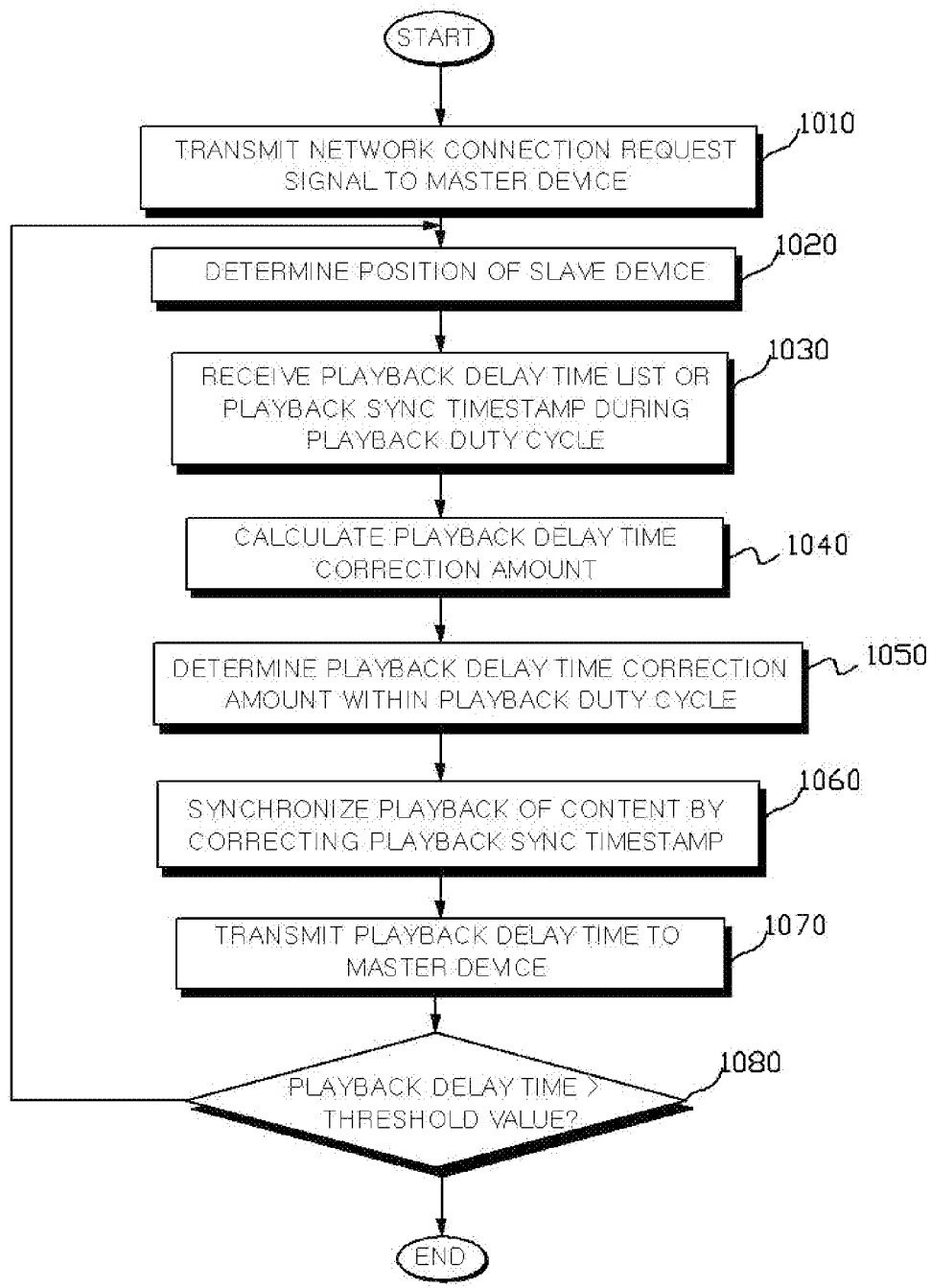

[FIG. 11]
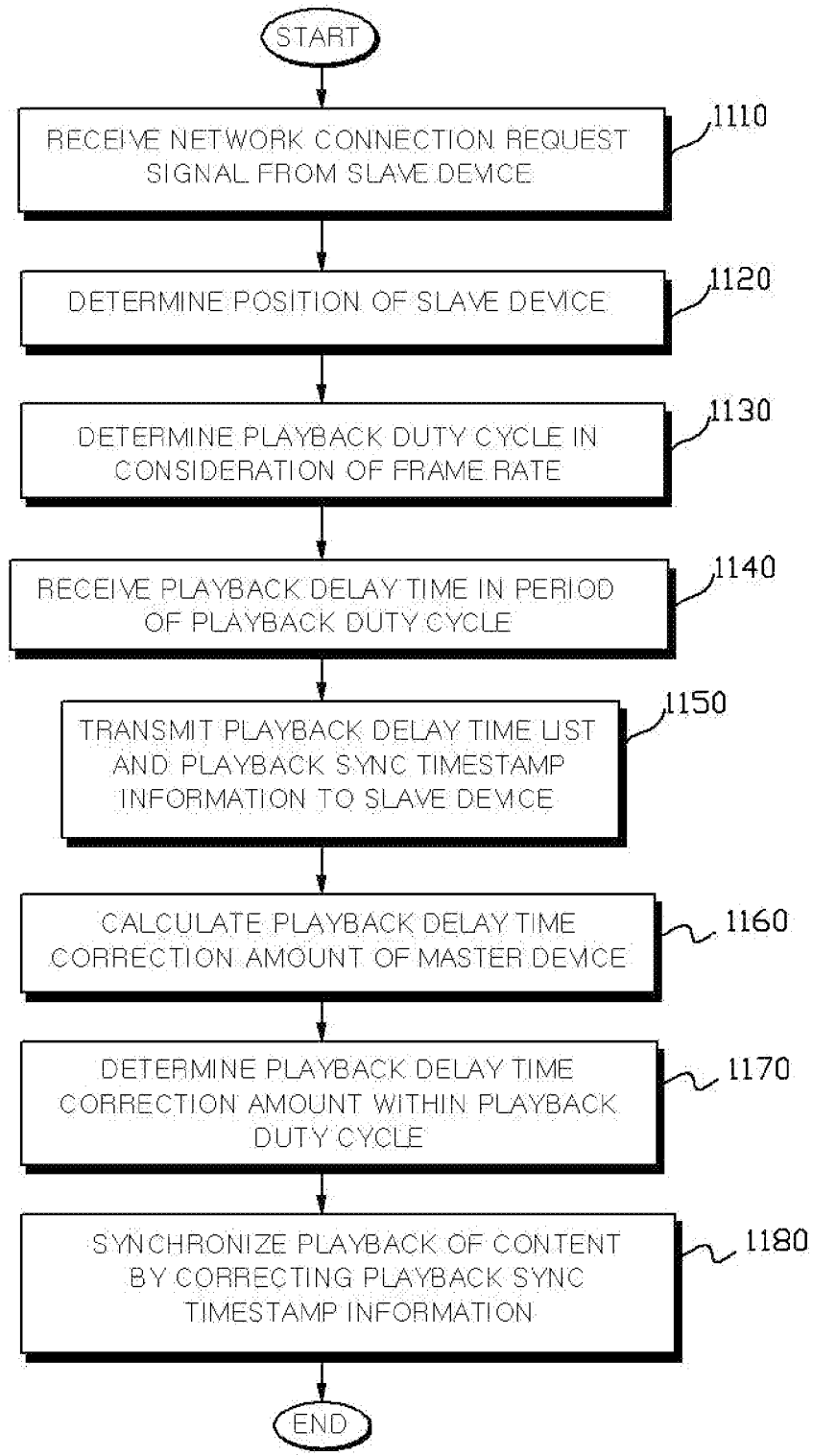

[FIG. 12]
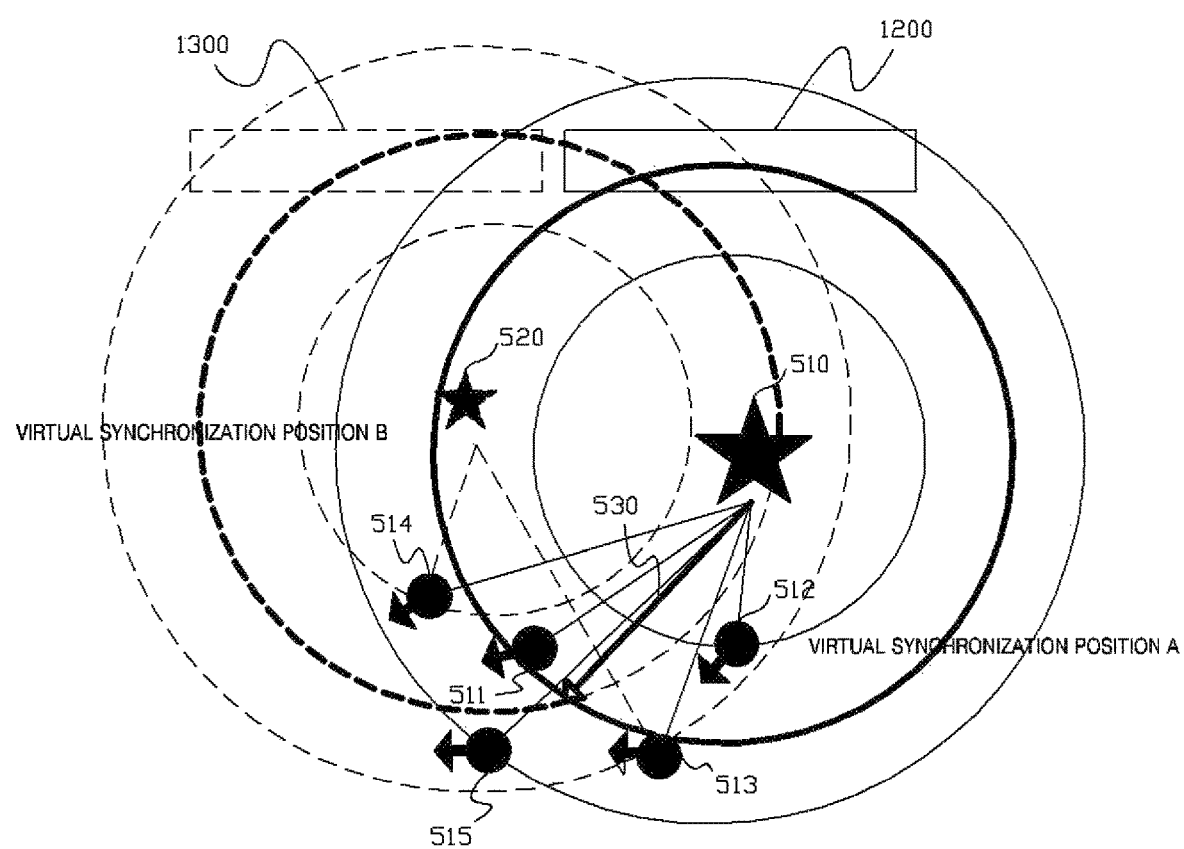

ize playback of video and audio of a digital content which enables a viewer to watch the same video and audio from various connected devices even in the case where the connected devices including a slave device and a master device are spaced apart from a sweet spot by different distances, respectively.

The second object to be solved by the present invention is to provide a connected device for synchronizing playback of video and audio of a digital content, which dynamically adjusts a sampling rate of a digital content in consideration of movement speed of a connected device to remove a Doppler effect affecting an audio arrival time to a sweet spot.

Further, the present invention is to provide a computer-readable recording medium in which a program for executing the method in a computer is recorded.

Technical Solution

In order to solve the first problem, the present invention provides a method of synchronizing playback of video and audio of a digital content, the method including: transmitting, by a plurality of connected devices connected to a network, a video playback delay time, an audio playback delay time, and position information to a master device; receiving a video playback delay time list or a video playback sync timestamp during a video playback duty cycle; receiving at least one of a virtual synchronization audio delay distance, audio delay distances of the connected devices, a sweet spot position, an audio playback delay time list, and an audio playback sync timestamp during an audio playback duty cycle; determining a video playback delay time correction amount from the video playback delay time list during the video playback duty cycle, and correcting the video playback sync timestamp in consideration of the video playback delay time correction amount; and correcting the audio playback sync timestamp with the audio playback delay time correction amount determined by using at least one of the virtual synchronization audio delay distance, the audio delay distances of the connected devices, the sweet spot position, and the audio playback delay time list during the audio playback duty cycle.

According to the exemplary embodiment of the present invention, it is desirable that the virtual synchronization audio delay distance is determined for each sweet spot position in consideration of a distance at which a sum of relative position differences between at least one sweet spot position and the plurality of connected devices is smallest.

Further, the method may include activating directional sub-speakers included in at least one device among the plurality of connected devices and the master device, in which the directional sub-speakers may be disposed in a direction of at least one of the sweet spot positions.

The method may further include, when a relative distance is changed between the plurality of connected devices or the master device and each sweet spot position, adjusting a frequency of an audio content output by the plurality of connected devices or the master device for the synchronization of the audio.

According to another exemplary embodiment of the present invention, there is provided a method of synchronizing playback of video and audio of a digital content, the method including: receiving, by a master device connected to a network, video playback delay times, audio playback delay times, and position information from connected devices; transmitting a list of the video playback delay times received from the connected devices and a video playback sync timestamp generated from the video playback delay time list

METHOD OF SYNCHRONIZING PLAYBACK OF VIDEO AND AUDIO OF DIGITAL CONTENT AND DEVICE USING THE SAME

CROSS-REFERENCE TO RELATED APPLICATIONS

This application is a U.S. National Stage of International Application No. PCT/KR2021/002504 filed Feb. 26, 2021, the entire content of which is incorporated herein by reference.

TECHNICAL FIELD

The present invention relates to a method of synchronizing playback of video and audio of a digital content, and more particularly, to a method of synchronizing playback of video and audio of a digital content which enables a viewer to watch the same video and audio from connected devices even in the case where the connected devices including a slave device and a master device are spaced apart from a sweet spot by different distances, respectively, and a device using the same.

BACKGROUND ART

In general, for the playback synchronization of audio contents and video contents, a master clock of a master device and a playback delay time need to be controlled. In the related art, local clocks of all of the slave devices are synchronized based on the master clock.

In this case, in a slave device having a large clock drift with the master clock or a slave device having low machine specifications and small available resources, playback synchronization available time is relatively short within a limited playback duty cycle. In order to solve the problem, in consideration of the state of the slave device, it is necessary to perform playback synchronization by adjusting the playback delay time together with the master device based on a different reference for each slave device.

Prior Art 1 (KR 10-2017-0016413 A, published on Feb. 13, 2017) relates to a playback synchronization method, in which a first device plays a content according to a playback schedule and transmits the playback schedule to a second device so that the second device is also capable of playing a content according to the playback schedule.

Prior Art 2 (KR 10-2017-0044922 A, Apr. 26, 2017) relates to a method of synchronizing and playing contents between multiscreen devices, and discloses the content that a first multiscreen device requests a content for synchronization to a second multiscreen device, and when the second multiscreen device provides the first multiscreen device with the content and synchronization information, the first multiscreen device performs content synchronization and playback by using the synchronization information.

However, reviewing Prior Arts 1 and 2, the plurality of devices only synchronize the contents by transmitting, by any one device, synchronization information to another device like the related art, but it is not possible to reduce the delay time between the plurality of devices while reflecting characteristics, such as different machine specifications and available resources, for each device.

DISCLOSURE

Technical Problem

Accordingly, the first object to be solved by the present invention is to provide a method of synchronizing playback to the connected devices; and transmitting a virtual synchronization audio delay distance generated by using the position information received from the connected devices, an audio playback sync timestamp, an audio delay distance of each connected device, a sweet spot position, or an audio playback delay time list to the connected devices.

According to another exemplary embodiment of the present invention, there is provided a method of synchronizing playback of video and audio of a digital content, the method including: transmitting, by a plurality of slave devices connected to a network, each video playback delay time, audio playback delay time, and position information to a master device; generating, by the master device, a video playback delay time list by using the video playback delay times received from the slave devices, and generating a video playback sync timestamp from the video playback delay time list; generating, by the master device, a virtual synchronization audio delay distance by using the position information received from the slave devices, and generating an audio playback sync timestamp by using the generated virtual synchronization audio delay distance; receiving, by the slave devices, the video playback delay time list or the video playback sync timestamp from the master device for each video playback duty cycle; receiving, by the slave devices, at least one of the virtual synchronization audio delay distance, the audio playback sync timestamp, an audio delay distance of each device, a sweet spot position, and an audio playback delay time list from the master device; determining, by the slave devices, video playback delay time correction amounts from the video playback delay time list, respectively, and correcting video playback sync timestamps in consideration of the video playback delay time correction amount, respectively; and correcting the audio playback sync timestamp with an audio playback delay time correction amount determined by using at least one of the virtual synchronization audio delay distance, audio delay distances of the master device and the slave devices, and the sweet spot position, and the audio playback delay time list.

In the meantime, when the sweet spot is one or more, it is desirable that all of the sweet spots are determined with positions at which an audio reflective wave is generable within a predetermined radius, or positions at which an audio reflective wave is not generable within the predetermined radius.

In order to solve the second problem, the present invention provides a connected device for synchronizing playback of video and audio of a digital content, the connected device including: a transmission unit configured to transmit a video playback delay time, an audio playback delay time, and position information to a master device in a connected device connected to a network; a reception unit configured to receive a video playback delay time list or a video playback sync timestamp during a video playback duty cycle, and receive at least one of a virtual synchronization audio delay distance, audio delay distances of connected devices, a sweet spot position, an audio playback delay time list, and an audio playback sync timestamp during an audio playback duty cycle; a video playback delay time correction amount determination unit configured to determine a video playback delay time correction amount from the video playback delay time list; a video timestamp correction unit configured to correct the video playback sync timestamp in consideration of the video playback delay time correction amount; and an audio timestamp correction unit configured to correct the audio playback sync timestamp with an audio playback delay time correction amount determined by using at least one of the virtual synchronization audio delay distance, the audio delay distances of the connected devices, the sweet spot position, and the audio playback delay time list during the audio playback duty cycle.

It is desirable that the virtual synchronization audio delay distance is determined for each sweet spot position in consideration of a relative position of at least one sweet spot position and the connected devices.

Directional sub-speakers included in the connected device may be disposed in a direction of at least one of the sweet spot positions.

Further, the connected device may further include an audio sampling rate determination unit configured to, when the relative distance between the connected device and each sweet spot position is changed, adjust a frequency of an audio content output by the connected device for synchronizing an audio heard at each sweet spot.

According to another exemplary embodiment of the present invention, there is provided a connected device for synchronizing playback of video and audio of a digital content, the connected device including: a reception unit configured to receive a video playback delay time, an audio playback delay time, and position information from connected devices connected to a network; a transmission unit configured to transmit lists of video playback delay times received from the connected devices and a video playback sync timestamp generated from the playback delay time list to the connected devices; a virtual synchronization delay distance generation unit configured to generate a virtual synchronization audio delay distance by using the position information received from the connected devices; and an audio playback sync timestamp generation unit configured to generate an audio playback sync timestamp by using the generated virtual synchronization audio delay distance, in which the transmission unit transmits the virtual synchronization audio delay distance, the audio playback sync timestamp, an audio delay distance of each device, a sweet spot position, or an audio playback delay time list to the connected devices.

According to another exemplary embodiment of the present invention, there is provided a system for synchronizing playback of video and audio of a digital content, the system including: at least one connected device including: a transmission unit configured to transmit a video playback delay time, an audio playback delay time, and position information to a master device; a reception unit configured to receive at least one of the video playback delay time list or the video playback sync timestamp from the master device during a video playback duty cycle, and receive at least one of a virtual synchronization audio delay distance, audio delay distances of the connected devices, a sweet spot position, an audio playback delay time list, and an audio playback sync timestamp from the master device during an audio playback duty cycle; a video playback delay time correction amount determination unit configured to determine a video playback delay time correction amount from the video playback delay time list; a video timestamp correction unit configured to correct the video playback sync timestamp in consideration of the video playback delay time correction amount; and an audio timestamp correction unit configured to correct the audio playback sync timestamp with an audio playback delay time correction amount determined by using at least one of the virtual synchronization audio delay distance, audio delay distances of the connected devices, the sweet spot position, and the audio playback delay time list during the audio playback duty cycle; and a master device including: a reception unit configured to receive a video playback delay time, an audio playback delay time, and position information from at least one connected device; a playback delay time list generation unit configured to generate a video playback delay time list from a video playback delay time received from at least one connected device; a video playback sync timestamp generation unit configured to generate a video playback sync timestamp from the generated video playback delay time list; a virtual synchronization delay distance generation unit configured to generate a virtual synchronization audio delay distance by using the position information received from at least one connected device and the sweet spot position; an audio playback sync timestamp generation unit configured to generate an audio playback sync timestamp by using the generated virtual synchronization audio delay distance; and a transmission unit configured to transmit the generated video playback sync timestamp and audio playback sync timestamp to at least one connected device.

In order to solve another technical problem, the present invention provides a computer-readable recording medium in which a program for executing the method of synchronizing playback of video and audio of the digital content in a computer is recorded.

Advantageous Effects

According to the present invention, even when connected devices including a slave device and a master device are spaced apart from a sweet spot by different distances, respectively, a viewer is capable of viewing the same video and audio from the connected devices.

Further, according to the present invention, a sampling rate of a digital content is dynamically adjusted in consideration of a movement speed of a connected device, so that it is possible to eliminate the Doppler effect affecting an audio arrival time to a sweet spot.

DESCRIPTION OF DRAWINGS

FIG. 1 illustrates a process of synchronizing playback of video and audio of a digital content between connected devices according to an exemplary embodiment of the present invention.

FIG. 2 illustrates clock information between a master device and slave devices connected through a network.

FIG. 3 is a block diagram illustrating a connected device for synchronizing playback of video and audio of a digital content according to the exemplary embodiment of the present invention.

FIG. 4 is a block diagram illustrating a master device for synchronizing playback of video and audio of a digital content according to the exemplary embodiment of the present invention.

FIG. 5 illustrates the case where the plurality of connected device synchronizes video and audio based on a sweet spot.

FIG. 6 illustrates a change in frequency according to a relative movement of a connected device and a sweet spot.

FIG. 7 illustrates a change in a length of wavelength according to a movement of a sound source.

FIG. 8 is a flowchart illustrating a method of synchronizing playback of video and audio of a digital content by a slave device according to the exemplary embodiment of the present invention.

FIG. 9 is a flowchart illustrating a method of synchronizing playback of video and audio of a digital content by a master slave device according to the exemplary embodiment of the present invention.

FIG. 10 is a flowchart illustrating a method of synchronizing playback of video of a digital content by a slave device according to another exemplary embodiment of the present invention.

FIG. 11 is a flowchart illustrating a method of synchronizing playback of video of a digital content by a master device according to another exemplary embodiment of the present invention.

FIG. 12 is the case where a playback sound environment around a sweet spot is considered.

BEST MODE

The present invention relates to a method of synchronizing playback of video and audio of a digital content, the method including: transmitting, by a plurality of connected devices connected to a network, a video playback delay time, an audio playback delay time, and position information to a master device; receiving a video playback delay time list or a video playback sync timestamp during a video playback duty cycle; receiving at least one of a virtual synchronization audio delay distance, audio delay distances of the connected devices, a sweet spot position, an audio playback delay time list, and an audio playback sync timestamp during an audio playback duty cycle; determining a video playback delay time correction amount from the video playback delay time list during the video playback duty cycle, and correcting the video playback sync timestamp in consideration of the video playback delay time correction amount; and correcting the audio playback sync timestamp with the audio playback delay time correction amount determined by using at least one of the virtual synchronization audio delay distance, the audio delay distances of the connected devices, the sweet spot position, and the audio playback delay time list during the audio playback duty cycle, and even when the connected devices including the slave device and the master device are spaced apart from the sweet spot by different distances, respectively, a viewer is capable of viewing the same video and audio from the connected devices.

MODE FOR CARRYING OUT THE INVENTION

In the case where the same audio is played back in a plurality of connected devices, an audio playback delay occurs depending on a position of a listener, and as a result, audio howling (noise caused by being out of synchronization) occurs. Accordingly, in order to remove the audio howling, it is necessary to synchronize an audio playback time between all of the connected devices.

When a sweet spot that is a position of a listener in which audio howling is removed is selected, it is desirable to generate an artificial audio playback delay in consideration of positions of all of the audio play devices and the time the audio reaches the sweet spot.

As a result, it is necessary to enable a viewer to listen to the audio without noise by displaying the same video to a video viewer in a plurality of connected devices and adjusting an audio delay time in consideration of position information of the video viewer and the connected devices.

Further, recently, a speaker in which multiple directional speakers are embedded in one speaker, such as an Artificial Intelligence (AI) speaker, is on the market. Accordingly, when the directional speaker is used, audio synchronization is possible in consideration of the plurality of sweet spots even in one speaker. Further, in the case where the connected device is a mobile device, a movement needs to be considered, so that it is necessary to synchronize audio in consideration of the Doppler effect in consideration of mutual movements.

Hereinafter, exemplary embodiments will be described in detail with reference to the accompanying drawings so that those skilled in the art can easily implement the present invention. However, the exemplary embodiments are for describing the present invention in more detail, and it will be apparent to those skilled in the art that the scope of the present invention is not limited thereto.

The configuration of the invention for clarifying the solution to the problem to be solved by the present invention will be described in detail with reference to the accompanying drawings based on the exemplary embodiment of the present invention, and it should be noted in advance that in assigning reference numerals to the components of the drawings, the same reference numeral is assigned to the same component even though the component is included in a different drawing, and components of other drawings may be cited if necessary when the drawing is described. In the detailed description of an operation principle of the exemplary embodiment of the present invention, when a detailed description and the various matters of a related publicly known function or constituent element is determined to unnecessarily make the subject matter of the present invention unclear, the detailed description and a detailed illustration thereof will be omitted.

FIG. 1 illustrates a process of synchronizing playback of video and audio of a digital content between connected devices according to an exemplary embodiment of the present invention.

Referring to FIG. 1, information for synchronization is transceived in the state where a master device 100 and a plurality of slave devices 200 (a first slave device to an $n^{th}$ slave device) connected through a network.

In operation 110, the plurality of slave devices 200 transmits video playback delay time information and audio playback delay time information to the master device 100 connected through the network. The slave device and the slave device, and the slave device and the master device are wirelessly connected through the network, so that the plurality of slave devices 200 may be a connected device. Further, the connected device may include a master device. It is desirable that a video or audio playback duty cycle of each slave device is determined in consideration of a frame rate of a content to be played back.

In operation 120, the plurality of slave devices 200 transmits position information about each slave device to the master device.

In operation 130, the master device 100 generates video playback delay time list information and a video playback sync timestamps of the entire slave devices 200 by using the video playback delay time information received in operation 110.

In operation 135, the master device 100 generates a virtual synchronization audio delay distance, a sweet spot position, and an audio delay distance of each slave device, an audio playback delay time list, or an audio playback sync timestamp by using the position information received in operation 120 and the audio playback delay time.

In operation 140, each slave device 200 receives the generated video playback delay time list information and video playback sync timestamp from the master device 100.

In operation 150, each slave device 200 receives the generated virtual synchronization audio delay distance, sweet spot position, and audio delay distance of each slave device, audio playback delay time list, or audio playback sync timestamp from the master device 100.

In operation 160, each slave device 200 determines a video playback delay time correction amount within the video playback duty cycle by using the video playback delay time list and the video playback duty cycle received from the master device 100. A delta playback delay time list representing a difference between a playback delay time of the master device and a playback delay time of each slave included in the list may be generated from the video playback delay time list.

In operation 170, each slave device 200 corrects the video playback sync timestamp in consideration of the video playback delay time correction amount. Even after the video playback sync timestamp is corrected, it is desirable that the time difference in the playback delay time between the slave devices is corrected within the layback duty cycle.

In operation 180, each slave device 200 corrects the audio playback sync timestamp with an audio playback delay time correction amount determined by using at least one of the virtual synchronization audio delay distance, the audio delay distances, the sweet spot positions, or the audio playback delay time lists of the connected devices during the audio playback duty cycle.

When a video of the digital content including video data is set to be synchronized to a specific video timestamp and played back, it is desirable to determine the audio playback time in consideration of the video timestamp, a position of a watcher, or a position of each slave device. In this case, each slave device may remove a difference in an audio arrival time transmitted to the listener by applying an audio delay time.

In operation 190, each slave device 200 determines an audio sampling rate in consideration of the Doppler effect.

In order to eliminate the Doppler effect that affect the audio arrival time, it is desirable to dynamically adjust the sampling rate of the digital content in consideration of a current movement speed of the slave device. The adjustment of the sampling rate may adjust a change in an audio frequency according to the position change of the moving slave device.

In the meantime, after the playback synchronization of the digital content between the master device and the slave device, when a feedback signal of the user is received and the feedback signal is transmitted during the playback duty cycle, the user feedback may be effectively processed without the time delay incurable in the plurality of devices.

FIG. 2 illustrates clock information between a master device and slave devices connected through a network.

Referring to FIG. 2, the master device plays a digital content according to a master clock 110, and the slave devices play the digital content according to local clocks 210, 220, 230, and 240 of the slaves, respectively.

A time point at which a specific digital content is played back in the master clock 110 of the master device is indicated by 111, and times at which the specific digital content is played back based on the slave local clocks 210 to 240 of the slave devices are indicated by 211, 221, 231, and 241.

Referring to the clock information illustrated in FIG. 2, it is represented that the first slave device and the fourth slave device play back the specific digital content faster than the master device, and the second slave device and the third slave device play back the specific digital content later than the master device.

It is desirable that the video playback delay time is calculated in consideration of timestamp information of the digital content played back during the video playback duty cycle in the master device and the slave devices. That is, the master device and the slave devices calculate the video playback delay time by calculating a difference in the timestamp of the digital content played back during the video playback duty cycle in consideration of each of the clock information 210 to 240.

That is, the video playback delay time may be defined as described below in consideration of two timestamps A and B of the digital content existing in one video playback duty cycle or the different video playback duty cycles. In the case where the timestamps exist in the different playback duty cycles, a playback duty cycle, in which the digital content playback needs to be synchronized, may be calculated by using a difference value between the timestamps A and B.

Playback delay time=$((n^{th}$ slave local clock (timestamp B of digital content)$-n^{th}$ slave local clock (timestamp A of digital content))$-($(timestamp B of digital content$-$timestamp A of digital content$))$.

In this case, the timestamps A and B exist in one playback duty cycle, and B has a larger value than that of A.

The timestamp is the time included in the digital content, and means a playback time of a specific frame in the case of a video digital content.

The $n^{th}$ slave local clock (the timestamp B of the digital content) means the local clock at which the timestamp B of the digital content is played back, so that $n^{th}$ slave local clock (timestamp B of digital content)—$n^{th}$ slave local clock (timestamp A of digital content) represents a difference between the local clocks at which the timestamp B and the timestamp A are played back in the $n^{th}$ slave device.

Further, (timestamp B of digital content—timestamp A of digital content) represents an absolute time difference between the timestamp B and the timestamp A.

Accordingly, the playback delay time may be calculated by reflecting the difference between the timestamps to the difference between the local clocks of the two timestamps.

The master device generates at least one of the video playback delay time list, a time difference between the video playback delay times, and the delta video playback delay time list (refers to a difference between the master video playback delay time and each slave video playback delay time, or a playback delay time list calculated based on a difference between a playback delay time of a virtual master device and the playback delay time of each slave device by selecting the virtual master device which minimizes the sum of the difference in the playback delay time between the respective devices, and in this case, the virtual master device for correcting the playback delay time may be changed for each duty cycle) received from the slave device for every uniform playback duty and broadcasts the generated one to all of the slave devices. In this case, it is desirable that the broadcasting is repetitively performed for each playback duty cycle.

It is desirable that the master device calculates a playback sync timestamp so that the slave devices connected to the network do not have problems in the playback synchronization during the playback duty cycle by using the playback delay time list information and broadcasts the playback sync timestamp.

The broadcasted video playback synchronization timestamp serves as a reference for application of the playback delay time to the digital content during a next playback duty cycle.

The reason why the master device broadcasts the playback sync timestamp is that it is possible to check the number of times of the playback duty cycle, at which the playback is efficiently synchronized, by using the playback delay time information of each slave device. Accordingly, the master device calculates the playback delay time differences of all of the devices by using the playback delay times of all of the slave devices, and when the calculated playback delay time difference is included in one playback duty cycle, an additional playback delay time correction is not required, so that the master device does not need to broadcast the playback sync timestamp.

However, even though the master device does not need to broadcast the playback sync timestamp, the slave devices may send the playback delay times to the master device through a strobe signal to help the master device to monitor the playback delay time.

In the meantime, the slave device may calculate a video playback delay time correction amount of the slave device by using the received video playback delay time list or delta video playback delay time list.

The video playback delay time correction amount of the slave device is not the video playback delay time correction amount transmitted from the master device and but is desirable to be calculated by each slave device, but the video playback delay time correction amount may be transmitted from the master device.

The video playback delay time and the video playback delay time correction amount will be described in more detail through the third slave local clock 230 of FIG. 2.

Referring to the third slave local clock 230 of the third slave device, the video playback delay time 232 is out of the corresponding duty cycle.

In this case, the third slave device may calculate an average playback delay time by using an average value of the video playback delay time difference lists or the delta video playback delay time lists of the master device and the slave device connected to the network without calculating the video playback delay time correction amount in consideration of the video playback delay time of the master device. A difference 234 between the calculated average playback delay time 233 and the playback delay time 232 of each device may be applied as a playback delay time correction amount 235 of the third slave device.

Each slave device needs to correct the timestamp information to be played back as much as the playback delay time correction amount. When the playback delay time correction amount is large, the playback delay time is large, so that a timestamp of the digital content that is earlier than that of another slave device is being played back. Accordingly, in this case, it is necessary to play the digital content to be played back in advance compared to another device. Accordingly, the slave device changes a current playback position of the digital content, that is, the timestamp, and stores the changed timestamp, and then plays the digital content.

Then, the slave device calculates a playback local clock by using the previously calculated timestamp and the current timestamp, and calculates a playback delay time, and transmits the calculated playback delay time to the master device for each uniform duty cycle. The master device may monitor a size of the received playback delay time and determine whether a broadcasting signal for playback synchronization is transmitted.

As another example, the average playback delay time may be applied as the playback delay time correction amount 235.

In this case, the master device applies the correction amount that is identical to the video playback delay time correction amount applied to the slave device, so that a playback time difference between the master device and the slave device connected to the network is reduced.

Further, all of the differences between the adjusted values included in the video delta playback delay time lists of the master device and the slave device connected to the network need to be smaller than the playback duty cycle and adjusted within the playback duty cycle. Accordingly, during the playback duty cycle, the time difference of the video playback time is relatively adjusted asynchronously between the master device and the slave devices, so that in the next playback duty cycle, the relative time difference decreases, and video playback synchronization may be performed stably between all of the devices.

By using the foregoing condition, the master device may set a playback sync timestamp.

The third slave device has a longer video playback delay time 232 than those of other devices, so that the possibility of playing the digital content by synchronizing a content frame to the video playback sync timestamp set by the master device is lowest. Accordingly, in order to increase the possibility of synchronizing content playback in multiple devices, as a method of minimizing the video playback delay time correction amount, a video playback delay time correction amount is calculated for each slave device by using an average value of the time differences of the entire playback delay time list and the calculated value is reflected to the video playback delay time within the playback duty cycle. It can be seen that when the video playback delay time correction amount 235 of the third slave local clock 230 is out of the playback duty cycle, the video playback delay time correction amount 235 is adjusted again to be included in the playback duty cycle range.

The master device may select the video playback sync timestamp within the predefined playback duty cycle by reflecting the video playback delay time correction amount condition. In this case, the video playback delay time correction amount 235 shorter than the video playback delay time 232 of the third slave local clock 230 is applied, and the video playback delay time correction amount 235 is adjusted within the playback duty cycle.

Accordingly, in the case of the third slave local clock 230, when the digital contents is played back with the video playback sync timestamp of the video playback duty cycle, the video playback delay time 235 occurs. Further, even in the case of the master device, the video playback delay time correction amount has been applied, so that the average value of the entire delta video playback delay time lists is reduced.

The playback duty cycle may be adjusted by using resolution and channel information of the content to be played back. When resolution of the content is high and a lot of channel information is included, each network device has a relatively low probability of playing the content at a specific playback time. Accordingly, as the resolution of the content to be played back is high and the number of channels is large, the master device may set the playback duty cycle to be relatively long. In FIG. 2, it is illustrated that the second playback duty cycle is set to be longer than the first playback duty cycle. The definition of the playback duty cycle may be set in the master device by using a frame rate and the channel information of the content to be played back.

The video playback sync timestamp is the playback synchronization time of each slave device set by the master device 100 in consideration of the video playback delay time.

When the video playback delay time correction amount is determined, the received video timestamp value of the digital content needs to be adjusted, and even when the playback delay time is adjusted by the video playback delay time correction amount 235 in the third slave device, there is a difference in the playback delay time from another slave device.

However, the video playback delay time 235 in the video playback duty cycle is shorter than the video playback delay time 232 generated in the previous playback duty cycle. Further, the time difference is also reduced in the video playback delay time list. Then, when the time difference satisfies a predetermined threshold value while the process is repeated, training for the video playback synchronization may be terminated or reserved.

The correction of the video playback delay time correction amount and the video playback synchronization timestamp of the master device or between the slave devices connected to the network needs to be continuously performed for every playback duty cycle, and for the synchronization, a training period for calculating the video playback delay time correction amount between all of the devices is required.

Thereafter, the master device may selectively broadcast the video playback delay time list or the delta video playback delay time list collected for each playback duty cycle only when retraining is required, and the slave device may apply the video playback delay time correction amount and the video playback synchronization timestamp correction when the video playback delay time list or the delta video playback delay time list is received.

The case where the master device determines the selective broadcasting of the video playback delay time list or the delta video playback delay time list during the training period is the case where at least one time difference among the time differences of the delta video playback delay time lists of all of the devices exceeds the playback duty cycle. In this case, the master device may make the playback of the content of the slave device be synchronized again by broadcasting the received video playback delay time list and a new video playback sync timestamp.

Further, the slave device may always transmit the video playback delay time or delta video playback delay time information generated in the slave device during the predetermined playback duty cycle to the master device as a strobe signal.

Another case where the master device determines the selective broadcasting of the video playback delay time list or the delta video playback delay time list is the case where a content frame rate is changed. When a communication state is not good or the content frame rate is artificially adjusted, the playback duty cycle needs to be adjusted, and thus, it is desirable to perform the training for the content playback synchronization between the plurality of devices.

FIG. 3 is a block diagram illustrating a connected device for synchronizing playback of video and audio of a digital content according to the exemplary embodiment of the present invention.

Referring to FIG. 3, the connected device for synchronizing playback of video and audio of a digital content according to the exemplary embodiment of the present invention includes a reception unit 300, a video playback delay time correction amount determination unit 310, a video timestamp determination unit 320, a video playback unit 330, an audio timestamp correction unit 340, an audio sampling rate determination unit 350, an audio playback unit 360, and a transmission unit 370.

The reception unit 300 receives a video playback delay time list or a video playback sync timestamp from the master device during a video playback duty cycle. The received video playback delay time list is generated by the master device by using the video playback delay time received from each of the plurality of connected devices. A time difference between the video playback delay times or the delta playback delay time list (refers to the difference between the master playback delay time and each slave playback delay time) may be generated from the video playback delay time list.

The reception unit 300 may receive a virtual synchronization audio delay distance, audio delay distances of the connected devices, sweet spot positions, an audio playback delay time list, or an audio playback sync timestamp of the connected devices from the master device during the audio playback duty cycle.

The video playback delay time correction amount determination unit 310 determines the video playback delay time correction amount by referring to the video playback delay time list in order to synchronize the playback between the master device and the plurality of connected devices. According to the exemplary embodiment of the present invention, the plurality of connected devices does not correct the playback delay time correction amount by using the video playback delay time of the master device, but it is desirable that the plurality of connected device applies the video playback delay time correction amount by using an average value of the playback delay time difference lists or the delta playback delay time lists of the master device and the slave device connected to the network. In the exemplary embodiment of the present invention, the average value is used, but other statistical values may be replaced.

The video timestamp correction unit 320 corrects the video playback sync timestamp in consideration of the video playback delay time correction amount.

The video playback unit 330 plays the digital content according to the determined video playback sync timestamp.

The audio playback delay time correction amount determination unit 335 determines an audio playback delay time correction amount by using at least one of the virtual synchronization audio delay distance, the audio delay distances of the connected devices, the sweet spot positions, and the audio playback delay time lists during the audio playback duty cycle.

The correction amount calculated by using the virtual synchronization audio delay distance, the audio delay distances of the connected devices, or the sweet spot position will be described in detail with reference to FIG. 5.

Further, the audio playback delay time correction amount may be calculated with the audio playback delay time list by the same method as the method of calculating the video playback delay time correction amount in the video playback delay time list described with reference to FIG. 2.

The audio timestamp correction unit 340 corrects the audio playback sync timestamp with the determined audio playback delay time correction amount.

When a relative distance between the connected device and each sweet spot position is changed, the audio sampling rate determination unit 350 determines a frequency of an audio content output by the audio playback unit 360 for the synchronization of the audio listened at each sweet spot.

The audio playback unit 360 plays the audio according to the determined audio playback sync timestamp and the frequency of the audio content.

The transmission unit 370 transmits the video playback delay time, the audio playback delay time, and the position information to the master device.

FIG. 4 is a block diagram illustrating the master device for synchronizing playback of video and audio of a digital content according to the exemplary embodiment of the present invention.

Referring to FIG. 4, the master device for synchronizing playback of video and audio of a digital content according to the exemplary embodiment of the present invention includes a reception unit 400, a video playback delay time list generation unit 410, a video playback delay time correction amount calculation unit 420, a video playback sync timestamp generation unit 430, a virtual synchronization delay distance generation unit 440, an audio playback sync timestamp generation unit 450, a video timestamp correction unit 460, a video playback unit 470, an audio timestamp correction unit 480, an audio sampling rate determination unit 485, an audio playback unit 490, and a transmission unit 495.

The reception unit 400 periodically receives the video playback delay time, the audio playback delay time, and the position information from the plurality of connected devices within the playback duty cycle.

The video playback delay time list generation unit 410 generates a video playback delay time list by using the playback delay time received from each of the plurality of connected devices.

A time difference between the playback delay times or the delta playback delay time list (refers to the difference between the master playback delay time and each slave playback delay time) may be generated from the video playback delay time list.

The video playback delay time correction amount calculation unit 420 calculates a video playback delay time correction amount by referring to the playback delay time list in order to synchronize playback between the plurality of connected devices. According to the exemplary embodiment of the present invention, the plurality of connected devices does not adjust the playback delay time correction amount by using the playback delay time of the master device, but it is desirable that the plurality of connected devices applies the playback delay time correction amount by using an average value of the playback delay time difference lists or the delta playback delay time lists of the master device and the slave device connected to the network.

The video playback sync timestamp generation unit 430 generates the video playback sync timestamp used in the playback synchronization according to the video playback delay time.

The virtual synchronization delay distance generation unit 440 generates a virtual synchronization audio delay distance by using the position information received from the slave devices.

The audio playback sync timestamp generation unit 450 generates an audio playback sync timestamp by using the generated virtual synchronization audio delay distance.

The video playback sync timestamp correction unit 460 corrects the video playback sync timestamp in consideration of the video playback delay time correction amount.

The video generation unit 470 plays the digital content according to the corrected video playback sync timestamp.

The audio playback delay time correction amount determination unit 475 determines an audio playback delay time correction amount by using at least one of the virtual synchronization audio delay distance, the audio delay distances of the connected devices, the sweet spot positions, and the audio playback delay time lists during the audio playback duty cycle.

The correction amount calculated by using the virtual synchronization audio delay distance, the audio delay distances of the connected devices, or the sweet spot position will be described with reference to FIG. 5.

Further, the audio playback delay time correction amount may be calculated with the audio playback delay time list by the same method as the method of calculating the video playback delay time correction amount in the video playback delay time list described with reference to FIG. 2.

The audio playback sync timestamp correction unit 480 corrects the audio playback sync timestamp with the determined audio playback delay time correction amount.

When a relative distance between the connected device and each sweet spot position is changed, the audio sampling rate determination unit 485 determines a frequency of an audio content output by the audio playback unit 490 for the synchronization of the audio listened at each sweet spot.

The audio playback unit 490 plays the audio according to the corrected audio playback sync timestamp and the frequency of the audio content.

The transmission unit 495 transmits the video playback delay time lists received from the slave devices and the video playback sync timestamp generated from the playback delay time list to the slave devices.

Further, the transmission unit 495 may transmit the audio playback sync timestamp generated in the audio playback sync timestamp generation unit 450, the virtual synchronization audio delay distance, the audio delay distances of the connected devices, the sweet spot position, or the audio playback delay time list to the slave devices.

FIG. 5 illustrates the case where the plurality of connected device synchronizes video and audio based on a sweet spot position.

The plurality of connected devices is the device including a movable mobile device, and may include automobiles, motor cycles, bicycles, mobile phones, wearable devices, and the like.

The plurality of connected devices is connected through wireless communication, and in the case of an automobile, Wireless Access in Vehicular Environment (WAVE) of the DSRC scheme and LTE V2X of the cellular V2X scheme may be used as the communication standard technology for V2X.

Further, IoT wireless communication technology, such as Wi-Fi, Bluetooth, ZigBee, LTE, 5G, LTE-M, LPWAN, and Z-WAVE, may be used in the plurality of connected devices.

Referring to FIG. 5, the master device 511 among the plurality of connected devices may select a plurality of sweet spot positions 510 and 520 and transmit the selected sweet spot positions 510 and 520 to the slave devices 512, 513, 514, and 515. It is desirable to select an area with a high mobile population density as the sweet spot position through Point-Of-Interest (POI) and real-time image analysis corresponding to a main area of interest.

FIG. 5 is the case where the sweet spot positions are selected as 510 and 520. In this case, the connected devices 511, 512, 513, 514, and 515 are the devices in which a large display device and multiple directional speakers are embedded, and the corresponding connected device may also be fixed without a position change and may be included in a moving mobile device, such as a vehicle.

Further, the multiple directional speakers are embedded in each connected device, so that multi-channel audio synchronization may be performed for several sweet spot positions by operating the directional speaker for the plurality of sweet spot positions.

Referring to FIG. 5, five connected devices are disposed based on the sweet spot 510. In this case, when video/audio synchronization is performed by using five connected devices based on the sweet spot 510, the sweet spot 510 and all of the connected devices 511, 512, 513, 514, and 415 are located at different distances, so that audio howling occurs. The difference in the occurrence of audio howling is due to the deviation between each connected device and the sweet spot position.

The howling may occur by a value obtained by dividing a value that is obtained by subtracting a distance between the connected device 512 located closest to the sweet spot 510 and the sweet spot 510 from a distance between the connected device 515 located farthest from the sweet spot 510 and the sweet spot 510 by an audio speed.

In order to reduce the occurrence of the audio howling, it is necessary to consider the distance difference between each connected device and the sweet spot position.

To this end, when the audio is output on an assumption that all of the connected devices 511, 512, 513, 514, and 515 are disposed to be located at a virtual sync position A so as to have the same distance from the sweet spot position 510, at the sweet spot position 510, the audio which has been synchronized with minimized audio howling may be heard. The virtual sync position A in consideration of the sweet spot position 510 may be calculated as described below.

An audio delay distance between connected device j and sweet spot i is a distance between an $i^{th}$ sweet spot and a $j^{th}$ connected device. The delay distance information may be recognized with the position information between the sweet spot and the connected device.

[Equation 1]

Virtual synchronization audio delay distance$_i$ = Average $$\left( \sum^{j} |\text{audio delay distance}_{ij} - \text{MIN(audio delay distance}_{ij})| \right)$$

Herein, i represents a sweet spot position index and j represents a connected device position index. MIN(audio delay distance$_{ij}$) represents the smallest distance value between the audio delay distances between the plurality of connected device and the sweet spot i.

Referring to FIG. 5, virtual synchronization audio delay distance, may define the virtual sync position A and virtual sync position B. A virtual synchronization audio delay distance 530 is used for defining the virtual sync position A.

As represented in Equation 1, the virtual synchronization audio delay distance, is a distance adjustment value for minimizing a distance difference between the position of the connected device j and the sweet spot i. Further, when the virtual synchronization audio delay distance, is calculated, the virtual synchronization audio delay distance, is applicable without the application of MIN(audio delay distance$_{ij}$), and this case is the case where an average value of the audio delay distance$_{ij}$ is applied.

In the meantime, when a correction audio delay distance$_{ij}$ is divided by a sound wave speed, an optimum audio delay time$_i$ for specific audio synchronization may be calculated.

Correction audio delay distance$_{ij}$ = |audio delay distance$_{ij}$ − [Equation 2]

-continued $$\text{Correction audio delay time}_{ij} = \frac{\text{virtual synchronization audio delay distance}_i|}{\text{Correction audio delay distance}_{ij}}$$
$$\text{audio speed}$$

Herein, i represents the number of sweet spot positions and j is the number of connected devices.

Each connected device may perform the audio synchronization by using the correction audio delay time$_{ij}$, and the master device 511 may broadcast an audio playback sync timestamp for the audio synchronization in consideration of the audio delay time$_{ij}$.

In the audio synchronization, regardless of the video synchronization, a different audio delay time needs to be applied for each connected device in consideration of the distance difference between the connected device position and the sweet spot position.

Accordingly, in consideration of the determined correction audio delay time$_{ij}$ in the determined audio playback sync timestamp, the audio playback sync timestamp of each connected device may be adjusted.

Further, there is a difference in playback time between video and audio, and even with the difference, it is desirable that the video/audio playback is adjusted to be naturally recognized at the sweet spot position.

When video/audio is asynchronized, the person generally perceives more sensitively to sound arriving earlier than to sound arriving later than video. The range of the level that humans are not aware of for the video/audio asynchronization can be presented as an example below.

TABLE 1

| Standard (year) | Delay threshold value (ms) | Advanced threshold value (ms) |
|---|---|---|
| ITU BT.1359 (1998) | −30 | +22.5 |
| ATSC IS/I91 (2003) | −45 | +15 |
| EBU R37 (2007) | −60 | +40 |

Accordingly, it is necessary to adjust the virtual synchronization audio delay distance within a range that satisfies the video/audio asynchronization level in Table 1. When the corresponding video/audio asynchronization range is converted to a distance in consideration of −60 ms that is the maximum value of the delay threshold value and +40 ms that is the maximum value of the advanced threshold value of Table 1, the distance is calculated as −20.58 m (−0.060 s×343 m/s) and 13.73 m (+0.040 s×343 m/s). Accordingly, when the asynchronization range according to the calculation is applied, the maximum adjustment range of the virtual synchronization audio delay distance is −20.58 to 13.73 m, and all of the connected devices include the position information error, so that when a timing error range according to the accumulated audio delay is better than the position accuracy of about 34 m, the side effects caused by the asynchronization of the video/audio playback time may be minimized. In the meantime, the virtual synchronization audio delay distance is the value calculated for the audio playback synchronization. Accordingly, there is a need for an audio playback duty cycle for calculating the virtual synchronization audio delay distance, and the audio playback duty cycle for determining the virtual synchronization audio delay distance for the video/audio synchronization has a longer period than the video playback duty cycle for the video playback synchronization.

The audio playback duty cycle of the virtual synchronization audio delay distance may be determined according to a body state of a listener, and it is known that a listener cannot perceive audio with a period less than 24 ms in a tension state.

Accordingly, when the asynchronization range according to the calculation is applied, the audio playback duty cycle for determining the virtual synchronization audio delay distance needs to be determined within a period shorter than 24 ms, and in order to determine the virtual synchronization audio delay distance, a distance error (position accuracy) between the connected devices based on the sweet spot position needs to be determined within 34 m.

Further, in order to satisfy the condition, the sweet spot position may also be changed during the audio playback duty cycle. In this case, the Doppler effect needs to be considered in consideration of the case where the position of the connected device and the position of the sweet spot are changed at the same time.

In this case, it is assumed that the sweet spot position is fixed even though the sweet spot position is actually changed, the Doppler effect may be applied by reflecting a relative speed change value of the connected device based on the sweet spot position.

The Doppler effect needs to be considered in the case where the position of the connected device or the position of the sweet spot is changed. For example, in the state where the sweet spot position is determined, the connected device may move in a predetermined direction. In this case, a change in an audio frequency occurs by the Doppler effect.

FIG. 6 illustrates a change in frequency according to a relative movement of a connected device and a sweet spot.

Referring to FIG. 6, in the case where the connected device does not move, the frequency of the audio measured at the sweet spot position may be measured as 502 as illustrated. However, it can be seen that when the connected device moves away from the sweet spot position at a predetermined speed (501), the frequency of the audio measured at the stopped sweet spot position is lowered, and when the connected device is close to the sweet spot position (503), the frequency of the audio measured at the stopped sweet spot position becomes high.

FIG. 7 illustrates a change in a length of wavelength according to a movement of a sound source.

Referring to FIG. 7(a), when the connected device is stopped, all of the lengths of the wavelength according to the distance of the sound source S are the same. However, as illustrated in FIG. 7(b), when a sound source moves to watcher A ($S_1 \rightarrow S_2 \rightarrow S_3 \rightarrow S_4$), the measured length of the wavelength of the sound source decreases by a movement speed, and at the same time, the audio frequency becomes high. In the meantime, watcher C moves away from the sound source, so that length of the wavelength increases and the audio frequency is lowered.

The frequency observed by the watcher by the Doppler effect is as follow.

$$f_{obs} = f_s \left( \frac{v_w}{v_w \pm v_s} \right) \qquad \text{[Equation 3]}$$

Herein, $f_{obs}$ is the frequency observed by the watcher, $f_s$ is the frequency of the sound source, $v_w$ is the speed of the audio, and $v_s$ is the speed of the sound source.

Accordingly, in order to synchronize the audio from the plurality of connected devices heard at the sweet spot positions, it is desirable to preselect a sampling rate of the digital contents in consideration of the Doppler effect. It is desirable to adjust the sampling rate of the digital content in the connected device by reflecting the position change between the moving connected device and the sweet spot position and the movement speed of the connected device, and adjust the change in the audio frequency according to the Doppler effect.

For example, in the case where $v_w$ is set as 340 m/s and the audio frequency that needs to be received at the sweet spot position is defined as 150 Hz, and the connected devices moves in a direction opposite to the sweet spot position at 35 m/s, the preferable playback audio frequency of the connected device corresponds to 165.4 Hz.

FIG. 8 is a flowchart illustrating a method of synchronizing playback of video and audio of a digital content by a slave device according to the exemplary embodiment of the present invention.

Referring to FIG. 8, the method of synchronizing playback of video and audio of a digital content by a slave device according to the present exemplary embodiment includes operations time-serially processed in the slave device illustrated in FIG. 3.

Accordingly, even if omitted below, the contents described above with respect to the slave device illustrated in FIG. 3 is also applied to the method of synchronizing playback of video and audio of a digital content by the slave device according to the present exemplary embodiment.

FIG. 8 illustrates the process for synchronizing video and audio with a video playback duty cycle and an audio playback duty cycle longer than the video playback duty cycle, and FIG. 10 illustrates the process of synchronizing video during the video playback duty cycle in order to synchronize playback of the video, so that FIG. 8 is different from FIG. 10. Both processes may be separately processed with different duty cycles, and when the video and the audio are synchronized as illustrated in FIG. 8, the video synchronization of FIG. 10 may be omitted.

In operation 800, a master device is determined among connected devices connected to a network.

In operation 810, a slave device transmits a video playback delay time, an audio playback delay time, and position information to the master device.

The position information of the slave device may also be determined by each slave device, and be determined by the master device. The position information of the slave device may be calibrated based on position information received from a camera mounted to the master device and the slave device. Further, the master device may calibrate the position information received from the slave device by using obtained image information and surrounding precise map information.

In operation 820, the slave device receives a video playback delay time list or a video playback sync timestamp from the master device during a video playback duty cycle.

In operation 830, the slave device receives a virtual synchronization audio delay distance, audio delay devices of the connected devices, or a sweet spot position, an audio playback delay time list, and an audio playback sync timestamp from the master device.

In this case, it is desirable to determine the audio playback duty cycle in consideration of position accuracy of the connected device and an audio frequency that needs to be received at the sweet spot position.

Further, when the position accuracy is high, the audio playback duty cycle may be set to be large, and when the position accuracy is low, it is desirable to monitor the position change by more frequently setting the audio playback duty cycle to be smaller.

The virtual synchronization audio delay distance and the audio playback sync timestamp correspond to each sweet spot position. For example, when several directional speakers are embedded in one speaker, an audio signal may be played back from one connected device (including the master device and the slave devices) to the plurality of sweet spot positions. Accordingly, the virtual synchronization audio delay distance and the number of audio playback sync timestamp may be determined according to the number of sweet spot positions.

As the position information of the connected device, information including the position information of the master device and all of the absolute position information of the slave devices may be received, or a relative distance value (a distance between an $i^{th}$ sweet spot and a $j^{th}$ connected device) may be received.

In operation 840, the slave device determines a video playback delay time correction amount from the video playback delay time list.

The video playback time delay of each slave device may be corrected by correcting the video playback sync timestamp with the video playback delay time correction amount.

In operation 850, the slave device corrects the video playback sync timestamp in consideration of the video playback delay time correction amount.

The video timestamp of the slave device is desirable to be determined in consideration of different machine specifications and available resource states of the slave devices and the positions of the slave device and the sweet spot.

In operation 860, the slave device corrects the audio playback sync timestamp in consideration of the audio playback delay time correction amount.

As the exemplary embodiment of the present invention, a process of calculating a sound delay time for synchronizing video and audio by reflecting a relative position value between the sweet spot position and the connected devices will be described in detail below.

The connected devices do not actually exist in the virtual synchronization audio delay distance, so that it is necessary to correct the audio playback sync timestamp as if the connected device plays the audio at the virtual synchronization audio delay distance.

For example, in FIG. 5, the connected device 515 is farther than the virtual synchronization audio delay distance 530, so that the connected device 515 needs to play back the audio earlier than other connected devices. Accordingly, it is possible to adjust the audio delay time of the audio playback by using the actual position information of the connected device and the virtual synchronization audio delay distance value. The calculation formula is as follows.

$$\text{Correction audio delay time}_{ij} = \frac{\left| \text{audio delay distance}_{ij} - \text{Virtual synchronization audio delay distance}_i \right|}{\text{audio speed}} \quad \text{[Equation 4]}$$

In operation 870, the slave device adjusts a sampling rate of the audio in consideration of the Doppler effect. When the connected devices move far away from the sweet spot position, the audio frequency reaching the actual sweet spot position is lower than the audio frequency at which the connected device plays back the audio. Further, in the opposite case, the audio frequency becomes high.

Accordingly, the correction of the Doppler effect according to the change in the movement speed of the connected device and the sweet spot is required. To this end, when the desired audio sampling rate at the sweet spot position is determined, and when the audio is played back by increasing the playback audio sampling rate in consideration of the change in the relative movement speed in the case where the distance between the connected device and the sweet spot position increases, the audio sampling rate transmitted to the actual sweet spot position has a smaller value than that of the played audio sampling rate, so that it is possible to finally obtain a desired audio sampling rate value.

After operation 870, it is desirable to transmit the updated position information of the connected device to the master device in order to synchronize the video and the audio.

Herein, as the position information, an absolute coordinate value of the connected device or a delta position distance representing the difference between the position value of the sweet spot and the position value of the connected device may be transmitted as a strobe signal during the video or audio playback duty cycle.

It is desirable that the video or audio playback duty cycle is performed within a period in which a person does not feel asynchronization of an audio signal or within a range in which a person does not feel the video/audio timing delay. Further, the audio playback duty cycle may be determined by the position accuracy of the connected device and the audio sampling rate of the audio signal to be received at the sweet spot position.

FIG. 9 is a flowchart illustrating a method of synchronizing playback of video and audio of a digital content by a master device according to the exemplary embodiment of the present invention.

Referring to FIG. 9, the method of synchronizing playback of video and audio of a digital content by a master device according to the present exemplary embodiment includes operations time-serially processed in the master device illustrated in FIG. 4. Accordingly, even if omitted below, the contents described above with respect to the master device illustrated in FIG. 4 is also applied to the method of synchronizing playback of video and audio of a digital content by the master device according to the present exemplary embodiment.

In operation 910, the master device receives video playback delay time, audio playback delay time, and position information from the slave devices.

In operation 920, the master device transmits the video playback delay time lists received from the slave devices and a video playback sync timestamp generated from the playback delay time list to the slave devices.

In operation 930, the master device generates a virtual synchronization audio delay distance by using the position information received from the slave devices.

The virtual synchronization audio delay distance 530 of FIG. 5 exists between the audio delay distance 512 of the slave device having the smallest value and the audio delay distance 515 having the largest value. The virtual synchronization audio delay distance 530 is a radius of a virtual concentric circle assuming that all of the connected devices exist at the same distance based on the sweet spot position 510. Accordingly, when it is assumed that the connected device is adjusted to be positioned at the concentric circle with the virtual synchronization audio delay distance as the radius, audio with minimal howling and sound delay may be transmitted at the sweet spot position.

Further, it is possible to effectively eliminate howling incurable due to the distance difference by adjusting a relative distance between the connected device and the sweet spot position and assuming that the distance difference between the sweet spot position and the connected device is the same, not by eliminating the sound delay due to the absolute distance difference between each connected device and the sweet spot position.

The virtual synchronization audio delay distance corresponds to each sweet spot position, and an equation for calculating the virtual synchronization audio delay distance is Equation 1.

The virtual synchronization audio delay distance may be determined by applying an average value in Equation 1 or additionally considering the change in the movement speed of the connected device.

In operation 940, the master device transmits the virtual synchronization audio delay distance generated by using the position information received from the slave devices, the audio playback sync timestamp, the audio delay distance of each device, the sweet spot position, or the audio playback delay time list to the slave devices.

The video delay time for the optimum synchronization of the video/audio playback may be calculated by using the generated virtual synchronization audio delay distance, and a corresponding equation is as follows.

$$\text{Video delay time}_i = \frac{\text{Virtual synchronization audio delay distance}_i}{\text{audio speed}} \quad \text{[Equation 5]}$$

The audio playback sync timestamp for synchronization may be determined by using the video delay time$_i$.

FIG. 10 is a flowchart illustrating a method of synchronizing playback of video of a digital content by a slave device according to another exemplary embodiment of the present invention.

Referring to FIG. 10, the method of synchronizing playback of video of a digital content by a slave device according to the present exemplary embodiment includes operations time-serially processed in the slave device illustrated in FIG. 3. Accordingly, even if omitted below, the contents described above with respect to the slave device illustrated in FIG. 3 is also applied to the method of synchronizing playback of video of a digital content by the slave device according to the present exemplary embodiment.

In operation 1010, the slave device requests the master device for a network connection request signal.

In operation 1020, the slave device determines a position of the slave device. The position information of the slave device may also be determined by each slave device, and be determined by the master device. The position information of the slave device may be calibrated based on position information received from a camera mounted to the master device and the slave device.

In operation 1030, the slave device receives a playback delay time list or delta playback delay time list information, and video playback sync timestamp information collected by the master device during a video playback duty cycle. It is desirable that the video playback duty cycle is determined by the master device in consideration of a frame rate of a played content. A local clock drift list or a delta local clock drift list may be further included in addition to the playback delay time list or the delta playback delay time list information.

In the meantime, the playback delay time list of the plurality of slave devices or the video playback sync timestamp used for the playback synchronization may be included in training data, and it is desirable that the training data used for the display playback synchronization within the playback duty cycle is periodically received. The playback sync timestamp information received in operation 1030 corresponds to the video playback sync timestamp information received in operation 820 of FIG. 8.

In operation 1040, the slave device calculates a playback delay time correction amount. In order to synchronize the playback between the slave devices, it is desirable that the playback delay time correction amount is calculated by referring to the playback delay time list included in the training data. In the meantime, the master device calculates a master clock correction amount.

In operation 1050, the playback delay time correction amount is determined within the playback duty cycle. Herein, the clock duty cycle is always shorter than the playback duty cycle. The master device may broadcast the playback sync timestamp synchronization information of the played content by using the playback delay time correction amount condition. In operation 1050, the slave device may additionally adjust a local clock correction amount within the clock duty cycle by using the local clock drift lists and the playback delay time lists of all of the slave devices connected to the network.

In operation 1060, the slave device corrects a timer and the playback sync timestamp synchronization information with the playback delay time correction amount determined in operation 1050 and synchronizes the playback of the content.

In operation 1070, the slave device transmits the playback delay time calculated in the period of the playback duty cycle to the master device. It is desirable that the playback delay time corrected with the playback delay time correction amount is included in the strobe signal based on the playback duty cycle and transmitted to the master device.

In operation 1080, the slave device may determine whether to transmit the playback delay time according to whether a predetermined threshold value is satisfied. When the playback delay time calculated in operation 1070 is larger than the threshold value, operation 1020 or operation 1030 may be performed, and when the playback delay time calculated in operation 1070 is not larger than the threshold value, the method may be terminated.

In the meantime, when the plurality of slave devices connected to the network transmits a user feedback signal to the master device, the slave devices transmits the user feedback signal in the same playback duty cycle section, so that the plurality of devices may effectively process the user real-time signal without a delay.

FIG. 11 is a flowchart illustrating a method of synchronizing playback of video of a digital content by a master device according to another exemplary embodiment of the present invention.

Referring to FIG. 11, the method of synchronizing playback of a digital content by a master device according to the present exemplary embodiment includes operations time-serially processed in the master device illustrated in FIG. 4. Accordingly, even if omitted below, the contents described above with respect to the master device illustrated in FIG. 4 is also applied to the method of synchronizing playback of video of a digital content by the master device according to the present exemplary embodiment.

In operation 1110, the master device receives a network connection request signal from the slave device.

In operation 1120, the master device determines a position of the slave device. The position information of the slave device may also be determined by each slave device, and be determined by the master device. The position information of the slave device may be calibrated based on position information received from a camera mounted to the master device and the slave device.

In operation 1130, the master device determines a playback duty cycle in consideration of a frame rate of a played content. It is desirable that the playback duty cycle is determined in consideration of channel information in addition to the frame rate of the digital content.

In operation 1140, the master device receives a playback delay time calculated in the period of the playback duty cycle from the slave device.

In operation 1150, the master device transmits a collected playback delay time list or delta playback delay time list information and playback sync timestamp information to the slave device for every playback duty cycle. The playback delay time list information or the delta playback delay time list information may include a local clock drift list or a delta local clock drift list.

The playback sync timestamp may be determined based on a time difference between the playback delay times present in the playback delay time list or within the playback duty cycle, that is, the delta playback delay time list.

As another exemplary embodiment, a timestamp at which a standard deviation between the playback delay times included in the playback delay time list is calculated smallest as a playback sync timestamp may be determined as the playback sync timestamp. The playback sync timestamp in operation 1150 corresponds to the video playback sync timestamp in operation 920 of FIG. 9.

In operation 1160, the master device calculates a video playback delay time correction amount.

In operation 1170, the master device may adjust a master clock correction amount (local-clock correction amount) within the clock duty cycle, or determine a video playback delay time correction amount within the playback duty cycle. Herein, the clock duty cycle is always shorter than the playback duty cycle. The master device may broadcast the playback sync timestamp synchronization information of the played content by using the playback delay time correction amount condition.

In operation 1180, the master device corrects a timer with the playback delay time correction amount determined in operation 1170 and corrects the playback sync timestamp synchronization information, and synchronizes the playback of the content.

FIG. 12 is the case where a playback sound environment around a sweet spot is considered.

The first environment is the case where sweet spot A 510 and sweet spot B 520 are identically located in buildings 1200 and 1300.

The second environment is the case where a free space exists behind the sweet spot B 520 without the building 1300.

Accordingly, in the first environment and the second environment, an echo environment of audio is different according to the existence of the free space. The echo is more pronounced at a low frequency in which the audio diffusion phenomenon is large. For the volume control for playing back the audio and maintaining a predetermined level of audio sound in the plurality of connected devices, it is desirable to consider an audio playback environment.

In order to maintain the same playback environment, when the multi-sweet spot is selected, the sweet spot may be selected as a place at which a building/wall/obstacle is located, or conversely, the multi-sweet spot may be selected in a free space.

Further, in order to maintain the predetermined level of audio volume in the same playback environment, the audio level may be determined by using a microphone mounted to each connected device. In this case, each connected device may determine an audio frequency range at which the audio volume level is measured by reflecting a low frequency range of the played audio. A measurement interval for determining the audio sound level may be determined by dividing the interval into a short-term/long-term interval. For example, the measurement interval may be applied by increasing the measurement interval to be higher than the audio level during the short-term interval and decreasing the measurement interval to be lower than the audio level during the long-term interval.

Further, in the audio volume level measured in the connected device, an audio level to be applied may be varied according to the sweet spot distance. When the measured audio level is not satisfied, a sound playback volume of a specific connected device needs to be adjusted, and in this case, it is desirable that the sound volume is preferentially adjusted for the connected device 513 playing back the sound with the multi-sweet spot and the connected device 511 existing at the position that has a large influence on the reflected sound based on the multi-sweet spot.

The term "~unit" used in the present exemplary embodiment refers to software or a hardware component, such as a Field Programmable Gate Array (FPGA) or an Application Specific Integrated Circuit (ASIC), and the "— unit" serves a specific role. However, the "~unit" is not limited to software or hardware. The "~unit" may also be configured to be included in an addressable storage medium, and may be configured to reproduce one or more processors. Accordingly, as an example, the "~unit" includes components, such as software components, object-oriented software components, class components, and task components, and processes, functions, attributes, procedures, subroutines, segments of a program code, drivers, firmware, micro-codes, circuits, data, database, data structures, tables, arrays, and variables. The components and the function provided in the "~unit" may be combined into a smaller number of components and "~unit" or further separated into additional components and "~units". In addition, components and the "~unit" may also be implemented to play one or more CPUS within a device or a security multimedia card.

All of the foregoing functions may be performed by a processor, such as a microprocessor, a controller, a microcontroller, and an ASIC, according to software or a program code coded so as to perform the function. A design, development, and implementation of the code may be obvious to those skilled in the art based on the description of the present invention.

Although the present invention has been described with reference to the exemplary embodiment of the present invention, it is understood that those skilled in the art may variously modify and change, and carry out the present invention without departing from the spirit and the scope of the present invention. Accordingly, the present invention is not limited to the foregoing exemplary embodiment, and may include all of the exemplary embodiments within the scope of the accompanying claims.

The invention claimed is:

1. A method of synchronizing playback of video and audio of a digital content, the method comprising:
    transmitting, by a plurality of connected devices connected to a network, a video playback delay time, an audio playback delay time, and position information to a master device;
    receiving a video playback delay time list or a video playback sync timestamp during a video playback duty cycle;
    receiving at least one of a virtual synchronization audio delay distance, audio delay distances of the connected devices, a sweet spot position, an audio playback delay time list, and an audio playback sync timestamp during an audio playback duty cycle;
    determining a video playback delay time correction amount from the video playback delay time list during the video playback duty cycle, and correcting the video playback sync timestamp in consideration of the video playback delay time correction amount; and
    correcting the audio playback sync timestamp with the audio playback delay time correction amount determined by using at least one of the virtual synchronization audio delay distance, the audio delay distances of the connected devices, the sweet spot position, and the audio playback delay time list.

2. The method of claim 1, wherein the virtual synchronization audio delay distance is determined for each sweet spot position in consideration of a distance at which a sum of relative position differences between at least one sweet spot position and the plurality of connected devices is smallest.

3. The method of claim 1, further comprising:
    activating directional sub-speakers included in at least one device among the plurality of connected devices and the master device,
    wherein the directional sub-speakers are disposed in a direction of at least one of the sweet spot positions.

4. The method of claim 1, further comprising:
    when a relative distance is changed between the plurality of connected devices or the master device and each sweet spot position, adjusting a frequency of an audio content output by the plurality of connected devices or the master device for the synchronization of the audio.

5. A connected device for synchronizing playback of video and audio of a digital content, the connected device comprising:
    a transmission unit configured to transmit a video playback delay time, an audio playback delay time, and position information to a master device in a connected device connected to a network;
    a reception unit configured to receive a video playback delay time list or a video playback sync timestamp during a video playback duty cycle, and receive at least one of a virtual synchronization audio delay distance, audio delay distances of connected devices, a sweet spot position, an audio playback delay time list, and an audio playback sync timestamp during an audio playback duty cycle;
    a video playback delay time correction amount determination unit configured to determine a video playback delay time correction amount from the video playback delay time list;
    a video timestamp correction unit configured to correct the video playback sync timestamp in consideration of the video playback delay time correction amount; and an audio timestamp correction unit configured to correct the audio playback sync timestamp with an audio playback delay time correction amount determined by using at least one of the virtual synchronization audio delay distance, the audio delay distances of the connected devices, the sweet spot position, and the audio playback delay time list during the audio playback duty cycle.

6. The connected device of claim 5, wherein the virtual synchronization audio delay distance is determined for each sweet spot position in consideration of a relative position of at least one sweet spot position and the connected devices.

7. The connected device of claim 5, wherein directional sub-speakers included in the connected device are disposed in a direction of at least one of the sweet spot positions.

8. The connected device of claim 5, further comprising:
an audio sampling rate determination unit configured to, when the relative distance between the connected device and each sweet spot position is changed, adjust a frequency of an audio content output by the connected device for synchronizing an audio heard at each sweet spot.

9. A computer-readable recording medium in which a program for executing the method of claim 1 in a computer is recorded.

* * * * *